US010063612B2

United States Patent
Brinkley et al.

(10) Patent No.: US 10,063,612 B2
(45) Date of Patent: Aug. 28, 2018

(54) REQUEST-BASED ENCODING FOR STREAMING CONTENT PORTIONS

(71) Applicant: Amazon Technologies, Inc., Seattle, WA (US)

(72) Inventors: Matthew Brinkley, Portland, OR (US); Alex Xiaoye Zhang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 120 days.

(21) Appl. No.: 15/283,075

(22) Filed: Sep. 30, 2016

(65) Prior Publication Data

US 2018/0097864 A1 Apr. 5, 2018

(51) Int. Cl.
| | |
|---|---|
| H04L 29/06 | (2006.01) |
| H04L 29/08 | (2006.01) |
| H04N 21/81 | (2011.01) |
| H04N 21/2668 | (2011.01) |
| H04N 21/234 | (2011.01) |
| H04N 21/488 | (2011.01) |

(52) U.S. Cl.
CPC ........ *H04L 65/602* (2013.01); *H04L 65/4084* (2013.01); *H04L 65/607* (2013.01); *H04L 65/608* (2013.01); *H04L 67/02* (2013.01); *H04L 67/10* (2013.01); *H04N 21/23424* (2013.01); *H04N 21/2668* (2013.01); *H04N 21/4882* (2013.01); *H04N 21/812* (2013.01)

(58) Field of Classification Search
USPC ................ 709/219, 201, 203, 218
See application file for complete search history.

(56) References Cited

U.S. PATENT DOCUMENTS

| | | | |
|---|---|---|---|
| 8,102,920 B2 * | 1/2012 | Suh ........................ | H04H 60/13 375/240.27 |
| 8,264,524 B1 * | 9/2012 | Davey ................ | H04N 5/23206 345/419 |

(Continued)

FOREIGN PATENT DOCUMENTS

| | | |
|---|---|---|
| WO | WO 2014/004955 | 1/2014 |
| WO | WO 2015/135576 | 9/2015 |

OTHER PUBLICATIONS

International Search Report for PCT Application No. PCT/US2017/053924 dated Jan. 3, 2018.

*Primary Examiner* — Jude Jean Gilles
(74) *Attorney, Agent, or Firm* — Knobbe, Martens, Olson & Bear, LLP

(57) ABSTRACT

Systems and methods are described to enable request-driven encoding of content portions to be played back as part of a content stream. A content stream can represent multiple types of content, each initially encoded according to different formatting parameters. Thus, playback of the multiple types of content as initially encoded would result in an inconsistently formatted content stream. To address this, a streaming content delivery service may respond to requests by determining whether consistently formatted content portions are available, and if such portions are not available, select fallback content portions for inclusion in the stream. The streaming content service can further initiate generation of the consistently formatted content portions in response to the request, such that subsequent requests may be serviced using the consistently formatted content portions.

20 Claims, 7 Drawing Sheets

(56) References Cited

U.S. PATENT DOCUMENTS

| | | | | |
|---|---|---|---|---|
| 8,498,422 B2* | 7/2013 | Oomen | ................ | G10L 19/008 |
| | | | | 381/17 |
| 9,923,771 B2* | 3/2018 | Shah | ................... | H04L 41/0893 |
| 2003/0135571 A1* | 7/2003 | Sato | ....................... | H04L 51/18 |
| | | | | 709/206 |
| 2011/0255841 A1* | 10/2011 | Remennik | ............ | G11B 27/005 |
| | | | | 386/248 |
| 2017/0366833 A1* | 12/2017 | Amidei | ................ | H04L 65/602 |

* cited by examiner

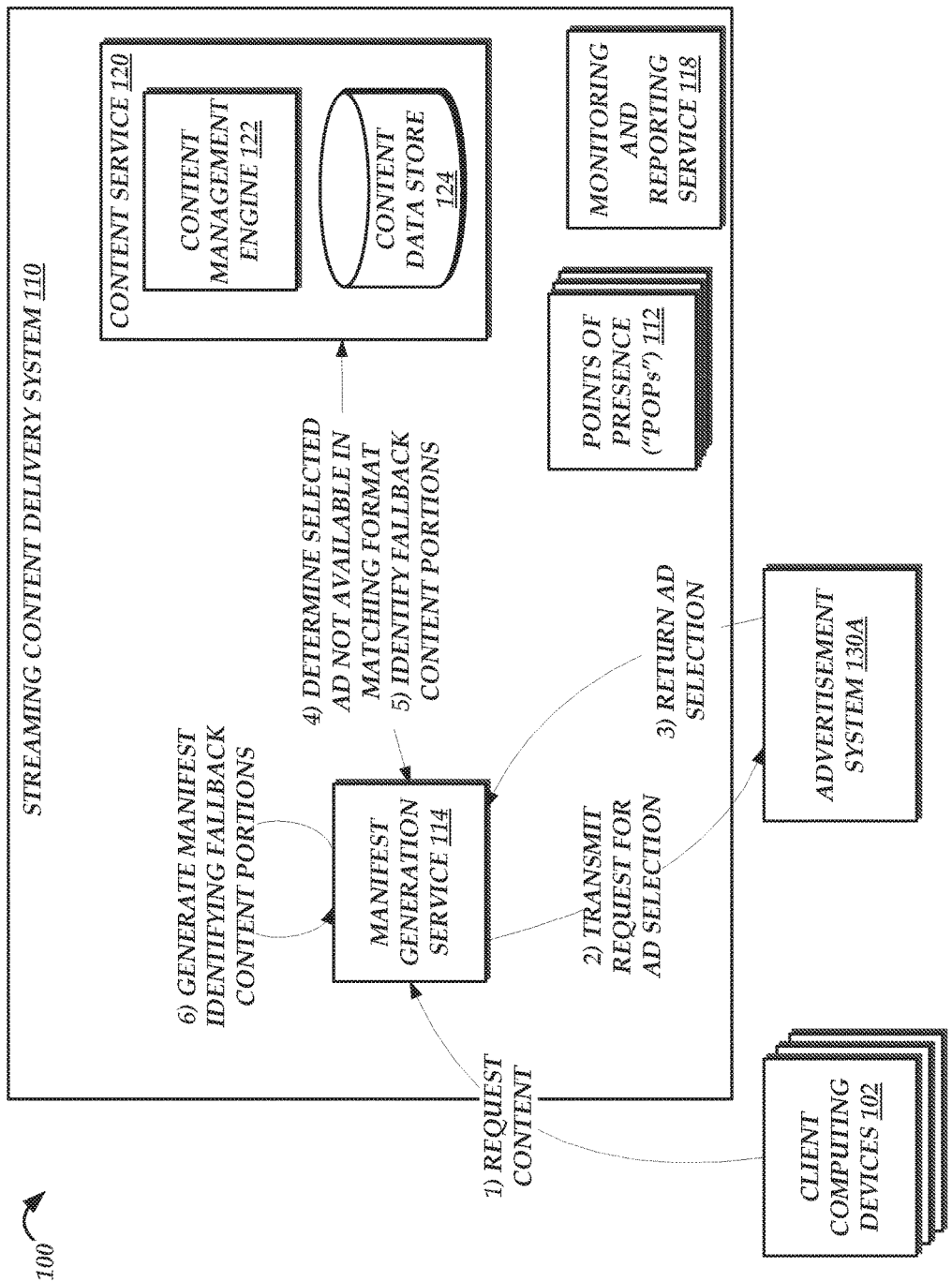

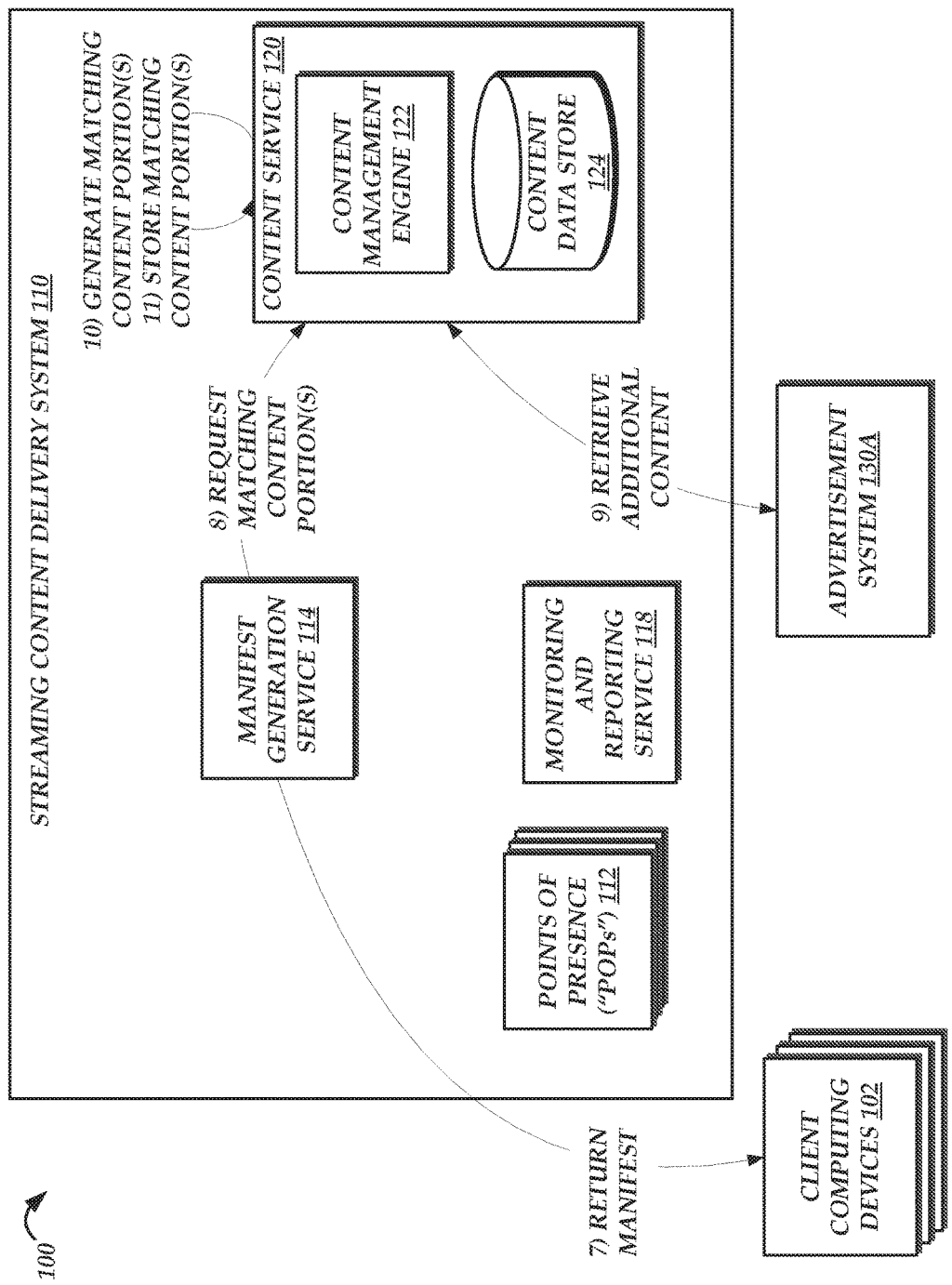

REQUEST-BASED ENCODING FOR STREAMING CONTENT PORTIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or streaming content delivery systems. Existing routing and addressing technologies can enable multiple data centers associated with a streaming content delivery system to provide similar or identical content to client computing devices. In some instances, each data center providing a set of content may be referred to as a point-of-presence ("POP"). A streaming content delivery system can maintain POPs over a wide area (or worldwide) to enable the system to efficiently service requests from clients in a variety of locations.

CDNs can be utilized to distribute wide varieties of content, and in some instances may serve to replicate or replace prior content distribution systems. For example, CDNs can provide network-based streaming video or audio content in a manner similar to traditional television or radio networks. This content is sometimes referred to as "internet television" or "internet radio," respectively. The streaming content can typically be viewed by dedicated computing devices (e.g., set top boxes), dedicated viewers on client computing devices (e.g., software applications), or non-dedicated software applications (e.g., web browsers). Often, these viewers provide functionality greater than the functionality available on traditional distribution networks, like television or radio, such as the availability to play content "on-demand." This flexibility can lead to a wide diversity of content being included within a content stream. For example, different users can be provided within different legal warnings according to their jurisdictional location, or with different advertisements according to their predicted preferences. However, the diversity of content can also result in inconsistent formatting within a content stream. For example, a main content may be formatted according to a first set of parameters, while additional content such as advertisements are formatted according to a second, different set of parameters. This inconsistent formatting can cause both technical issues, as playback devices attempt to play content of differing format, and an undesirable user experience.

BRIEF DESCRIPTION OF THE DRAWINGS

FIGS. 3A and 3B are block diagrams depicting illustrative interactions of the streaming content delivery system of FIG. 1 for responding to a client request for a content stream by generating a manifest file identifying content portions forming the content stream, and for encoding at least one of the content portions, in response to the client request, to match other content portions included in the content stream;

DETAILED DESCRIPTION

Figure 1:
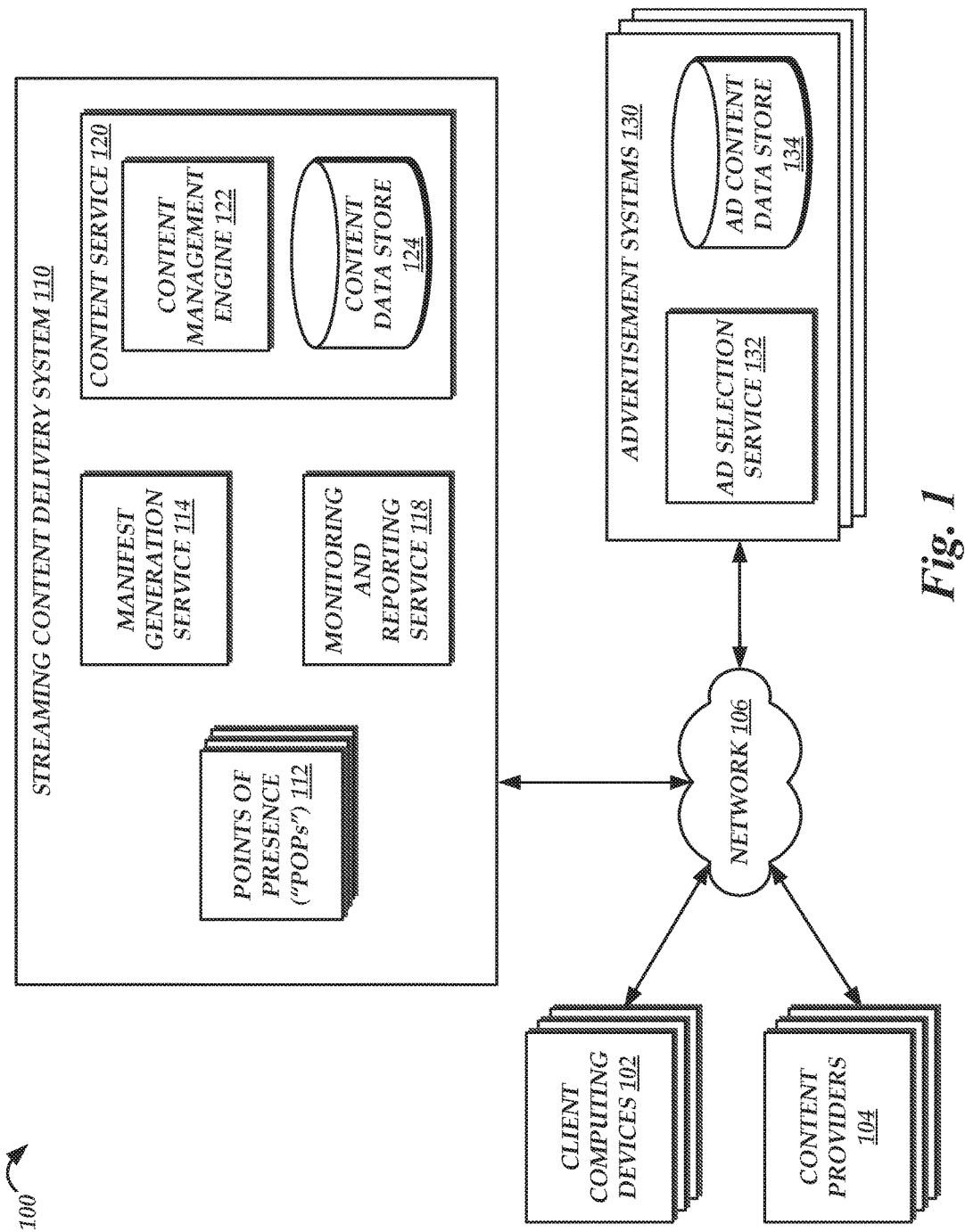
FIG. 1 is a block diagram depicting an illustrative logical network environment including client computing devices, content providers, and advertisement systems, as well as a streaming content delivery system configured to provide a content stream to the client computing devices, the content stream including content portions encoded, in a request for the content stream, to the to match other content portions included in the content stream.

Generally described, the present disclosure relates to providing a content stream over a communication network, where at least a portion of the content stream is encoded in response to the request for the content stream itself. More specifically, the present disclosure enables the dynamic encoding of content portions, within a content stream, to match parameters or aspects of other portions within the content stream, to reduce technical issues associated with playback of inconsistent content streams and prevent disruption to an end user's experience due to inconsistent formatting within the content stream. Illustratively, aspects of the present disclosure can enable on-the-fly insertion of various content types into a content stream, while maintaining consistent formatting between content portions within the content stream. This formatting may include, for example, the resolution, bitrate, and frame rate of a video content. As another example, the formatting may include bitrate, frame rate, or normalization values of audio content. As an example, the present disclosure can enable inclusion of additional content portions, such as disclaimers, legal warnings, or advertisements, within a content stream in a manner that maintains consistent formatting within the content stream, without requiring the additional content portions to be maintained in a pre-encoded state prior to a request for the content stream. Thus, embodiments of the present disclosure can enable the additional content portions to be included into a stream to be determined on-the-fly, such as in response to a request for the content stream, while also enabling those additional content portions to match the formatting of the content stream, resulting in a better user experience and reducing technical problems that may arise due to inconsistent formatting. In addition, embodiments of the present disclosure can enable use of fallback portions, such as default content portions, in instances where a "matching" content portion (e.g., a content portion with formatting matching those of other portions in the content stream) is not available.

As described herein, a content stream generally refers to content that is divided into portions (sometimes referred to as "segments" or "chunks") that may be transmitted and viewed independently, such that a client may begin to watch a first portion while downloading a second. The various portions of a content stream are often identified within one or more manifests, which provide metadata regarding the streaming content as well as a list of portions within the content. Each portion may be identified within the manifest based on a resource identifier (such as a uniform resource indicator, or "URI") or file name, which a client computing device may use to obtain and output the portions. Often, multiple types of content are identified within a single manifest. For example, a manifest may identify a legal warning to be output, a first portion of a main content, an advertisement, a second portion of a main content, etc. Each of these portions can correspond to a separate file, which is encoded according to potentially independent parameters to result in portions with different formatting. Illustratively, a legal warning may be encoded at a first bitrate, resolution, and frame rate, and main content may be encoded at a second bitrate, resolution, and framerate, advertisements may be encoded at a third bitrate, resolution, and framerate, etc. While client computing devices can often output portions encoded according to disparate parameters, this can result in a disruptive user experience. In some instances, it can also cause technical issues with playback, such as causing delay as the configuration of an output device (e.g., monitor) is altered to facilitate different encoding parameters. Moreover, some client computing devices may utilize information regarding encoding parameters of portions to selectively block or filter unwanted content, such as legal warning and notifications, credits, dedications, or advertisements. Devices or software that block such content are sometimes referred to as "ad blockers." Ad blockers often function by monitoring manifests for information that designates specific resources as unwanted content. For example, ad blockers may attempt to identify unwanted content by detecting the encoding parameters of different portions, and identifying portions with given parameters (e.g., a lower bitrate than the surrounding portions) as containing unwanted content. After identifying unwanted content, ad blocks may remove those portions from the manifest file or otherwise prevent the client computing device from displaying the portion. These modifications prevent clients from viewing important content and can have a detrimental effect on content providers (e.g., by reducing the effectiveness of legal warnings, reducing advertising revenue of the content provider, etc.).

Embodiments of the present disclosure address these issues by enabling creation of content streams including "matching" content portions, such that portions within the content stream share common formatting parameters, even when those portions correspond to different types of content (e.g., main content and additional content). For ease of description, examples will be described in which a content stream includes portions corresponding to a television program as a main content as well as an advertisement as an additional content. However, main content may include any requested streaming content (e.g., audio, video, or textual content, as well as combinations thereof), while additional content may include any content added to the main content to form a content stream. In instances where a content stream includes both a television content and advertising content (e.g., both represented by respective content portions within the stream), different encoding parameters for the television content and advertising content can disrupt either or both of an end user experience and operation of a client computing device attempting to output the content stream. One possible solution for addressing this issue is to maintain different pre-encoded versions of each possible advertising content, with a version matching each possible format of each possible television content. However, the variety of possible advertising content, television content, and encoding parameters often renders such approaches impossible or impractical. For example, where advertising content is determined on a per-user or per-request basis, the specific advertising content included within a content stream may vary widely from user to user or over time. Moreover, television content may be associated with a variety of different versions, each encoded with a variety of parameters (e.g., different resolutions). Thus, pre-encoding all possible advertising content to match parameters of all possible television content can be computationally prohibitive, both in terms of processing power required to conduct such pre-encoding and in terms of memory required to maintain pre-encoded content. Accordingly, embodiments of the present disclosure provide a streaming content delivery service utilizing request-driven encoding to encode advertising content (or other additional content) as appropriate within a given content stream. For example, where a client requests a content stream including a desired television content, the streaming content delivery service can determine an advertising content to be included in the content stream, and encode, at the time of the client request, the advertising content with parameters matching those of the television content. Accordingly, the content stream may be output with constant parameters, reducing potential technical problems due to changes in those parameters and improving the overall user experience, which may be disrupted by changing parameters. Further, because such encoding need only occur in response to client requests, the streaming content delivery service is enabled to encode advertising content with matching parameters only on an "as needed" basis, reducing the computational requirements of the streaming content delivery service. In some instances, the streaming content delivery service is configured to cache such encoded advertising content (or other additional content), such that the cached content can be included in subsequent content streams without re-encoding. Cached content may be continuously or periodically deleted to reduce the computing resources required to maintain the cache.

A streaming content delivery service may in some instances implement request-driven encoding by use of "optimistically" created manifests for a content stream. As described above, a manifest may generally include identifying information for various portions of content, and a client computing device may process the manifest by retrieving and outputting the portions identified within a manifest. Generally, there can be expected to be at least some delay between generation of a manifest and retrieval of portions identified within the manifest by a client computing device, given that the manifest must be transmitted to the client computing device before portions identified within the manifest can be retrieved. In some instances, this delay can be significant, as client computing devices may be configured to retrieve portions identified within a manifest only as required during playback (e.g., portions representing a next n seconds of the content stream relative to a current playback position). Accordingly, the streaming content delivery service may generate manifests that identify matching content portions for a stream, such as portions representing advertising content, even before those matching content portions have been created. This is generally referred to herein as "optimistic" manifest creation. Simultaneously to or after generation of such manifests, the streaming content delivery service can begin to generate the matching content portions, as will be described below. In the instance that generation of a matching content portion completes before a request from a client computing device is received for that matching content portion, the matching content portion can then be transmitted to the client computing device and included within a content stream. Thus, matching content portions can be created on-the-fly, in response to client request for a content stream.

In some instances, optimistic manifest creation can result in requests from client computing devices for content portions that are not yet available. For example, assume that optimistic manifest creation results in a manifest that identifies "pre-roll content," such as a legal warning, that is encoded with parameters matching a main content for the content stream. Further assume that the pre-roll content is scheduled, via the manifest, to playback prior to the main content, and that the matching pre-roll content has not yet been created by the streaming content delivery system. In such instances, a client computing device may request the pre-roll content before the streaming content delivery system has completed creation of the pre-roll content. In traditional systems, such a request may result in an error (e.g., a hypertext transport protocol, or "HTTP," error code "404"), which is generally undesirable. Accordingly, embodiments of the present disclosure can enable use of fallback content portions, in the instance that a content portion requested by a client computing device is not yet available. Illustratively, in the example provided above, the streaming content delivery system may maintain a default version of the pre-roll content identified in the manifest file, such that client requests for the matching pre-roll content result in delivery of the default version of the pre-roll content in instances where the matching pre-roll content is not available. While use of fallback content portions may result in different formatting parameters among the content streams within a content stream, this result may be more desirable than allowing errors to occur at a client computing device. As described in more detail below, where the streaming content delivery system utilizes fallback content portions, these content portions may be formatted to enable proper handling of the fallback content portions by various components of the streaming content delivery system. For example, the fallback content portions may be generated with a low or zero "time-to-live" value, such that components of the streaming content delivery system that might otherwise cache the fallback content portions (e.g., points of present, or "POPs") are instructed not to do so. As a further example, rather than returning a fallback content portion directly in response to a request for a matching content portion, the streaming content delivery system may return a redirection (e.g., via an HTTP 3xx redirect code) to the fallback content portion. These techniques may ensure that subsequent requests for the matching content portion are properly handled, and are not automatically fulfilled by providing the fallback content portion.

While some examples are provided with respect to specific types of streaming content, such as audio and video, embodiments of the present disclosure may be utilized to control delivery of any content divided into discrete sections that are identified to a user by a manifest. Moreover, while examples are provided herein with respect to content distribution systems, embodiments of the present disclosure may be implemented with respect to any network of computing devices that operates to serve streaming content to client computing devices. Thus, the examples provided herein are intended to be illustrative, and not exhaustive, in nature.

As will be appreciated by one of skill in the art in light of the description above, the embodiments disclosed herein substantially increase the ability of computing systems, such as streaming content delivery systems, to deliver streaming content to users that is consistently encoded according to a matching set of parameter. Moreover, embodiments disclosed herein substantially increase the ability of computing systems, such as streaming content delivery systems, to delivery streaming content in a protected manner, such that client devices are inhibited or prevented from modifying the output of one or more portions with the content stream. Thus, the presently disclosed embodiments represent an improvement in the functioning of such computing systems, by enabling streaming content delivery systems or other networked devices to replicate and reproduce functionality provided by traditional distribution networks, such as television and radio networks. Moreover, the presently disclosed embodiments address technical problems inherent within computing systems; specifically, the limited computing resources available to encode content with appropriate parameters, the limited control that network transmission systems have of data after transmission to a client computing device, and the high potential for client devices to modify that content in an undesirable way. These technical problems are addressed by the various technical solutions described herein, including the use of request-driven encoding for content portions, optimistic manifest generation, and the use of fallback portions to service requests for a content portion that is not yet available. Thus, the present disclosure represents a substantial improvement on existing network systems and computing systems in general.

In some instances, embodiments of the present disclosure may utilize additional techniques to inhibit removal or tampering with a content stream. For example, a streaming content delivery system as described in the present disclosure may utilize concealed identifiers within a manifest of streaming content, which inhibit a client computing device from distinguishing between different types of content based on those identifiers. Systems and methods for generating and utilizing concealed identifiers in streaming content are described in more detail within U.S. patent application Ser. No. 15/162,423, filed on May 23, 2016 and entitled "PROTECTING CONTENT-STREAM PORTIONS FROM MODIFICATION OR REMOVAL" (the "'423 application"), the entirety of which is hereby incorporated by reference.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple client computing devices 102, content providers 104, and advertisement systems 130 in communication with a streaming content delivery system 110 via a network 106. While the client computing devices 102, the content providers 104, and the advertisement systems 130 are shown as grouped within FIG. 1, the client computing devices 102, content providers 104, and advertisement systems 130 may be geographically distant, and independently owned or operated. For example, the client computing devices 102 could represent a multitude of users in various global, continental, or regional locations accessing the streaming content delivery system 110. Further, the content providers 104 could represent a multitude of related or distinct parties that have associated with the streaming content delivery system 110 to provide content, such as web sites, multimedia, or other digital, network-deliverable content to the client computing devices 102. Still further, the advertisement systems 130 could represent a multitude of related or distinct parties provided advertising content to be included within content associated with the content providers (e.g., and providing revenue to the content providers). While shown as distinct, the client computing devices, content providers 104, or advertisement systems 130 may be operated by a common entity, or by a common computing device. Accordingly, the grouping of client computing devices 102, content providers 104, and advertisement system 130 within FIG. 1 is intended to represent a logical, rather than physical, grouping. Similarly, each of the components of the streaming content delivery system 110 may be located within geographically diverse areas. For example, the streaming content delivery system 110 can contain POPs 112 at a variety of globally, continentally, or regionally distinct locations, in order to provide a wide geographical presence for the streaming content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, content providers 104, advertisement systems 130, and streaming content delivery system 110 is depicted as having a single connection to the network 106, individual components of the client computing devices 102, content providers 104, advertisement systems 130, and streaming content delivery system 110 may be connected to the network 106 at disparate points. Accordingly, communication times and capabilities may vary between the components of FIG. 1.

Client computing devices 102 may include any number of different computing devices capable of communicating with the streaming content delivery system 110. For example, individual client computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.). In some instances, client computing devices 102 may further be configured to report information regarding output of content to the streaming content delivery system 110, such as whether specific portions of content were output by the client computing device. The specific configuration of individual client computing devices 102 may vary. For example, most client computing devices 102 may retrieve and output streaming content without modification; however, some client computing devices 102 may include hardware or software configured to modify streaming content to remove specific portions (e.g., legal warnings, credits, dedications, advertisements, etc.).

Content providers 104 may include any computing device owned or operated by an entity that provides content to the streaming content delivery system 110 for subsequent transmission to client computing devices (which may include one or more client computing devices 102). For example, content providers 104 may include servers hosting streaming audio, video, text, multimedia, or interactive services (e.g., video games, virtual or augmented reality content, or other immersive content). While illustratively shown in FIG. 1 as a network-attached computing device, content providers 104 may additionally or alternatively provide content to the streaming content delivery system 110 via non-networked communication channels (e.g., via physical delivery of data).

Advertisement systems 130 can include any computing device owned or operated by an entity that provides advertising content to the streaming content delivery system 110 for inclusion within other content (e.g., streaming video). Advertising may include pictures, text, audio, video, or any other content to be inserted within other content types provided by the streaming content delivery system 110. Illustratively, the advertising may be stored by the advertisement systems 130 within the ad content data store 134, which may correspond to any persistent or substantially persistent data storage, such as a hard drive (HDD), a solid state drive (SDD), network attached storage (NAS), a tape drive, or any combination thereof. In some instances, the advertisement systems 130 may be configured to select the specific advertisements to be included within streaming content provided by the streaming content delivery system 110 (e.g., based on attributes of a client computing device 102). Accordingly, the advertisement systems 130 may include an ad selection service 132 configured to receive information regarding content to be streamed to a client computing device 102 (e.g., including attributes of the client computing device 102 itself) and to return a selection of advertising to be included within the streaming content. In one embodiment, the streaming content delivery system 110 and the ad selection service 132 may communicate by use of a standard protocol or specification, such as the Video Ad Serving Template (VAST) specification provided by the INTERACTIVE ADVERTISING BUREAU™ ("IAB"), which enables a streaming content service to transmit information regarding streaming content and to receive, from the advertisement system 130, information regarding what advertising should be played, how the advertising should be played, and notification information for the advertising (e.g., URIs to which requests should be sent as various portions of the advertising is output). The operation of advertisement systems 130, including ad selection services 132, is generally known within the art and thus will not be described in detail herein. While illustrative embodiments are described with regard to distinct advertisement systems 130 that select advertisements for inclusion in content streams, the streaming content delivery system 110 may additionally or alternatively operate without interaction with advertisement systems 130 (e.g., by integrating an ad selection service 132 into the streaming content delivery system 110, by selecting advertising based on a set of rules, by providing static advertising, by integrating non-advertising content as protected content, etc.).

The streaming content delivery system 110 can include a variety of components and devices configured to enable client computing devices 102 to access streaming content provided to the streaming content delivery system 110 by the content providers 104 and the advertisement systems 130. Specifically, the streaming content delivery system 110 can include a number of POPs 112 configured to host streaming content, or act as a caching point for streaming content hosted by the streaming content delivery system 110, the content providers 104, and/or the advertisement systems 130. Each POP 112 may include a variety of computing devices configured to serve content to client computing devices 102. Accordingly, though not shown in FIG. 1, each POP 112 may include any number of processors, data stores, or networking components operating in conjunction to facilitate retrieval and delivery of streaming content to client computing devices. The POPs 112 may communicate with other components of the streaming content delivery system 110 via an internal network of that system 110, which may include any wired network, wireless network, or combination thereof, and may be a personal area network, local area network, wide area network, cable network, satellite network, cellular telephone network, or combination thereof. In some instances, the internal network may be implemented at least in part by the network 106 (e.g., as a virtual private network, or "VPN"). Illustratively, each POP 112 may function to hold a limited selection of content portions within a local cache data store (e.g., the most recently requested n content portions), such that these content portions can be quickly transmitted to client computing devices 102. When the local cache data store does not include a requested content portion, the POP 112 can be configured to retrieve the content portion from a remote data store, such as a content data store 124 of a content service 120 within the streaming content delivery system 110, the ad content data store 134, or a data store within a system of a content provider 104 (not show in FIG. 1), and return the content portion to a requesting client computing device 102.

The streaming content delivery system 110 can further include a manifest generation service 114 configured to respond to client requests for streaming content, and to generate a manifest that identifies a number of content portions to be provided to a requesting client computing device 102. As will be described in more detail below, the manifest generation service 114 may interact with other components of the streaming content delivery system 110 as well as external components, such as the advertisement systems 130, to select the specific content portions to be identified within the manifest. These content portions may be selected, for example, such that each content portion is encoded according to matching or otherwise interchangeable parameters (e.g., a common bitrate, frame rate, or resolution). In some instances, the manifest generation service 114 can further communicate information to other components of the streaming content delivery system 110, such as the monitoring and reporting service 118 and the POPs 112, that enable such components to interact with or process content received from client computing devices. For example, where the manifest generation service 114 generates a manifest including concealed identifiers, as described within the '423 application (incorporated by reference above), the manifest generation service 114 may transmit concealed identifier information to the monitoring and reporting service 118 and the POPs 112, to enable those components to determine underlying (non-concealed) identifiers for each viewed portion. In accordance with embodiments of the present disclosure, the manifest generation service 114 may in some instances generate manifests optimistically, such that at least one content portion identified in the manifest is not yet available at the streaming content delivery system 110. Accordingly, the manifest generation service 114 can notify a content service 120 of such optimistic manifest generation, such that the content service 120 can begin to generate any content portions that are not yet available.

The content service 120 may be configured to generate content portions for use in a content stream, such as content portions identified within a manifest file, but not yet available on the streaming content delivery system 110. Illustratively, the content service 120 can include a content management engine 122 that receives manifest information from the manifest generation service 114, identifies any content portions referenced within the manifest that are not yet available within a content data store 124, and generations such content portions. In one embodiment, the content management engine 122 itself may encode such content portions, by retrieving a source content (e.g., an uncompressed or high quality version of a content item to be included in a content stream) and generating content portions from the source content, according to the desired encoding parameters for the source content. In another embodiment, the content management engine 122 may interact with a separate encoding system to direct the system to encode a source content according to desired encoding parameters. One example of a separate encoding system is described within U.S. patent application Ser. No. 15/194, 347, entitled "SYNCHRONIZATION OF MULTIPLE ENCODERS FOR STREAMING CONTENT," and filed Jun. 27, 2016 (the "'347 application"), the entirety of which is hereby incorporated by reference herein. After content portions have been encoded, they may be stored in the content data store 124 to make those portions available to the client computing device 102 that have received manifests, to the POPs 112, or to other components of the streaming content delivery system 110. The content data store 124, which may be utilized to store the generated content portions as well as other content (e.g., as provided by the content providers 104, the advertisement systems 130, etc.) can correspond to any persistent or substantially persistent data storage, such as a hard drive (HDD), a solid state drive (SDD), network attached storage (NAS), a tape drive, or any combination thereof.

The content service 120 may further be configured to handle requests for content portions, as may be received from the POPs 112 or the client computing devices 102. Illustratively, the content management engine 122 may receive a request for a content portion, and determine whether the content portion is included within the content data store 124. If so, the content management engine 122 may return the requested content portion to a requesting device. Otherwise, the content management engine 122 may return a fallback content portion to the requesting device. As will be described in more detail below, the fallback content portion may correspond to a different version of the requested content portion, such as a version with content encoded according to parameters that do not match other content portions within a content stream, and may be provided to prevent errors that would otherwise be associated with a request for an unavailable content portion. In some instances, the content service 120 may return the fallback content portion in a manner that prevents future requests for the requested content portion from being automatically fulfilled by delivery of the fallback content portion. Illustratively, the content service 120 may prevent the POPs 112 from caching the fallback content portion as the requested content portion, such that subsequent requests for the requested content portion are also delivered to the content service 120 (e.g., rather than being serviced from a cache of the POP 112).

The streaming content delivery system can further include a monitoring and reporting service 118, which includes one or more servers configured to process monitoring information regarding output of content on client computing devices. Illustratively, the monitoring and reporting service 118 may log information indicating what content has been output on client computing devices 102. In some instances, the monitoring and reporting service 118 may further transmit notifications in response to output of content on a client computing device 102. Further details regarding transmission of notifications by a monitoring and reporting service 118 are included within U.S. patent application Ser. No. 15/282,929, entitled "OUTPUT TRACKING FOR PROTECTED CONTENT-STREAM PORTIONS," and filed concurrently herewith on Sep. 30, 2016, the entirety of which is hereby incorporated by reference herein.

It will be appreciated by those skilled in the art that the streaming content delivery system 110 may have fewer or greater components than are illustrated in FIG. 1. In addition, the streaming content delivery system 110 could include various web services and/or peer-to-peer network configurations. Thus, the depiction of the streaming content delivery system 110 in FIG. 1 should be taken as illustrative. For example, in some embodiments, components of the streaming content delivery system 110, such as the manifest generation service 114 or the content service 120, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 2:
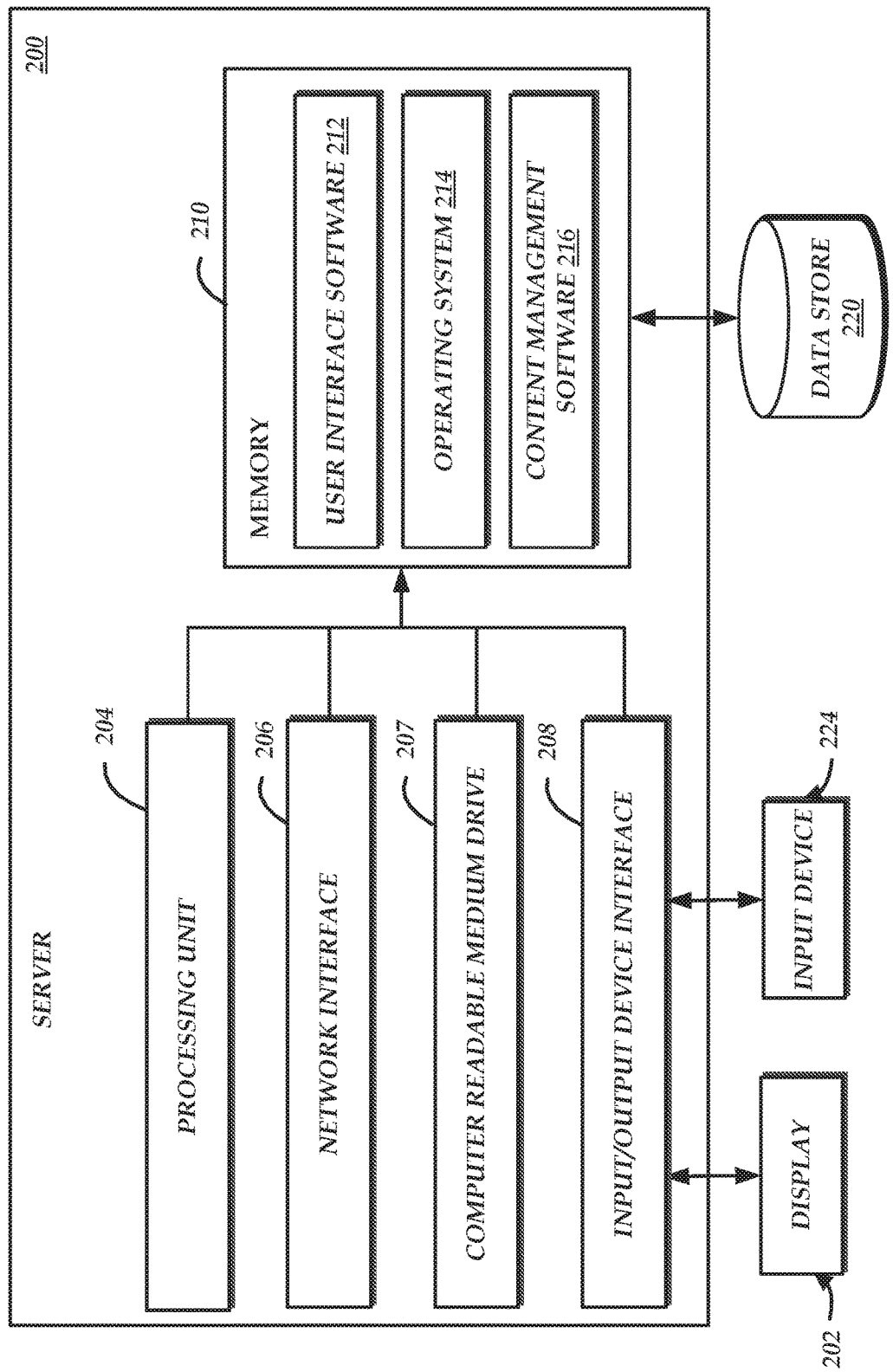
FIG. 2 is a block diagram depicting an illustrative configuration of one embodiment of a server that may implement a content management engine within the streaming content delivery system of FIG. 1.

FIG. 2 depicts one embodiment of an architecture of a server 200 that may implement the content management engine 122 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 208, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 208. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes random access memory (RAM), read only memory (ROM) and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 220, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include content management software 216 that may be executed by the processing unit 204. In one embodiment, the content management software 216 implements various aspects of the present disclosure, e.g., identifying content portions not yet available at the streaming content delivery system, generating those content portions according to desired parameters, and managing requests for content portions (e.g., by providing content portions when available, or fallback content portions when requested content portions are not available). While content management software 216 is shown in FIG. 2 as part of the server 200, in other embodiments, all or a portion of the software may be implemented by alternative computing devices within the streaming content delivery system 110, such as the manifest generation service 114.

FIGS. 3A and 3B depict a set of illustrative interactions for generating a manifest for delivery to a client computing device 102 to enable the device 102 to output a content stream from the streaming content delivery system 110, the content stream including a set of portion encoded according to a set of matching parameters. While shown as two figures, the interactions of FIGS. 3A and 3B are numbered sequentially and may be undertaken in conjunction.

The interactions begin at (1) of FIG. 3A, where a client computing device 102 requests content from a manifest generation service '114 of the streaming content delivery system 110. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110. As described below, this information may be utilized by the streaming content delivery system 110 and/or an advertisement system 130 to determine additional content to be provided to the client computing device 102, such as legal warnings, credits, dedications, or advertisements, any of which the streaming content delivery system 110 may encode on-the-fly, in response to the request from the client computing device 102, such that the additional content is provided in portions with encoding matching other portions within the content stream (e.g., portions of the main content).

As noted above, in addition to the main content requested by the client computing device 102, streaming content can also include one or more other types of content, such as legal warnings, credits, dedications, or advertisements. This content will generally be described herein as "additional content." In some instances, the manifest generation service 114 itself may determine what additional content is to be included within a content stream. For example, the manifest generation service 114 may include a specific legal warning within all content streams, or may maintain a set of rules that determine what additional content should be provided within a stream (e.g., based on criteria such as the main content requested, attributes of the request, attributes of the client computing device 102, etc.). In other instances, the manifest generation service 114 may interact with other components, such as advertisement system 130, to determine what additional content to include within the content stream. Because the additional content can be determined at the time that a manifest file is generated, the additional content can be targeted specifically to the client computing device 102 or the client of that device 102. For example, specific advertisements can be included within a content stream that are likely to be relevant to a client. For the purposes of description of FIG. 3A, it will be assumed that the manifest generation service 114 is configured to interact with an advertisement system 130A to determine at least one advertisement to include within a content stream as additional content.

Accordingly, at (2), the manifest generation service 114 transmits a request to the advertisement system 130A for selection of an advertisement to be included within a content stream, and thus identified within a manifest file delivered to the client computing device 102. In one embodiment, the request may be formatted according to the VAST specification, and may include any information regarding the request, such as information regarding the requested main content, attributes of the client computing device 102, attributes of the client of that device 102, etc. In response, at (3), the advertisement system 130A returns an indication of an advertisement to be included in the content stream as additional content. Specific interactions for selection of advertisements by the advertisement system 130A are outside the scope of the present disclosure, and thus will not be discussed in detail.

As discussed above, it may be generally desirable that each content portion forming a part of a content stream being encoded according to matching parameters (e.g., bitrate, frame rate, resolution, etc.). Thus, at (4), the manifest generation service 114 can interact with the content service 120 to determine whether content portions corresponding to the selected advertisement are available in a format encoded according to parameters matching other content portions forming part of a content stream (e.g., content portions corresponding to a main content, as requested by a client computing device 102). In the instance that content portions corresponding to the selected advertisement and encoded according to matching parameters are available at the content service 120, such as within the content data store 124, the manifest generation service 114 can include an identifier of the matching content portions within a manifest for the content stream, and return the manifest to the client computing device 102 to enable the client computing device 102 to output the content stream. However, for the purposes of description of FIG. 3A, it will be assumed that matching content portions for the selected advertisement (e.g., content portions representing the advertisement as encoded according to parameters matching those of other content portions to be included within a content stream) are not available at the content service 120. Thus, at (5), the manifest generation service 114 interacts with the content server 120 to determine one or more fallback content portions for inclusion within the content stream. In one embodiment, the fallback content portions may represent a non-matching version of the selected advertisement, such as a version of the selected advertisement encoded according to parameters different than the encoding parameters of other content portions to be included within a content stream. For example, the fallback content portions may represent a low definition version of the selected advertisement, where the remaining content portions within a content stream are high definition. In another embodiment, the fallback content portions may represent content other than the selected advertisement, such as an alternative advertisement. Illustratively, the fallback content portions may represent an alternative advertisement encoded in a format that matches the encoding parameters of other content within the content stream, such that inclusion of the fallback content portions in the content stream is not disruptive to playback of the content stream. For example, where a main content within a content stream is formatted according to "high definition" parameters, the manifest generation service 114 may determine that the selected advertisement is not available in content portions formatted according to the "high definition" parameters, but that an alternative advertisement is available in portions formatted according to the "high definition" parameters. Thus, the manifest generation service may select portions corresponding to the alternative advertisement as the fallback content portions.

Thereafter, at (6), the manifest generation service 114 generates a manifest for the content stream, identifying the fallback content portions as well as portions corresponding to the requested main content. Generally described, generation of the manifest may include identification of what content is to be streamed to the client computing device (e.g., main content and any additional content), the relative order of that content (e.g., as determined by the information provided by the advertisement system 130A or other information maintained at the manifest generation service 114), and a set of content portions that, when played in sequence, form the desired content stream. For example, where the manifest generation service 114 determines that a three minute advertisement should be streamed before then streaming a thirty minute television program, the manifest generation service 114 may generate a manifest that identifies content portions forming the three minute advertisement, as well as content portions that form the thirty minute television program. Accordingly, with reference to the interactions of FIG. 3A, generation of a manifest may include creating a manifest file including identifiers of a set of content portions corresponding to a main content, as well as identifiers of the fallback content portions. The manifest may also include metadata regarding the stream, such as a format of the content portions, length of each portion, overall duration of the stream, etc. In one embodiment, the manifest is formatted in accordance with the APPLE™ HTTP live streaming protocol, or "HLS." In other embodiments, the manifest may be formatted in accordance with other streaming protocols, such as the dynamic adaptive streaming over HTTP ("DASH") protocol, the ADOBE™ HTTP dynamic stream (HDS) protocol, or the MICROSOFT™ smooth streaming (MSS) protocol. Typically, manifests generated according to these protocols include identifiers for each content portion that correspond to actual files on a network-based system. For example, manifests may indicate a URI for each content portion that corresponds to a video file (such as a transport stream, or "ts" file) stored on a network-based storage device. Thus, by downloading and outputting these video files, a client can stream the content identified in the manifest.

In some instances, direct placement of actual identifiers within a manifest can provide an opportunity for client computing devices 102 to selectively modify the manifest to remove unwanted portions, or block downloading or output of specific content portions. Thus, the manifest generation service 114 may, at (4), generate a "concealed" manifest, which identifies content portions by concealed identifiers that prevent or inhibit client computing devices 102 from distinguishing between different types of content, as described within the '423 application (incorporated by reference above).

The interactions of FIG. 3A are continued on FIG. 3B, where the manifest generation service 114 transmits the manifest for the content stream to the client computing device 102, at (7). As will be described below (e.g., with respect to FIGS. 4A and 4B), the client computing device 102 may thereafter process the manifest in order to retrieve content portions forming the content stream, and output the content stream to a client.

As discussed above, it may be generally desirable that each content portion identified within a manifest represent content that is encoded according to matching parameters (e.g., bitrate, frame rate, resolution, etc.). In the interactions of FIG. 3A, it is assumed that content portions corresponding to an advertisement selected for inclusion in a content stream are not available in a format encoded according to parameters matching other portions of the content stream. While the manifest generation service 114 may operate to select fallback content portions for inclusion in the stream in such instances, the manifest generation service 114 may be configured to attempt to limit further occurrences, by directing the content service 120 to encode the selected advertisement according to matching parameters in response to the request for the content stream. In this manner, content portions representing the selected advertisement, as encoding according to the matching parameters, may be made available at the content service 120 for inclusion in other content streams, such as requests from alternative client computing devices 102 for the same main content or other main content formatted according to the same parameters as the main content represented within the content stream discussed with respect to FIG. 3A.

Accordingly, at (8), the manifest generation service 114 transmits a request to the content service 120 to generate content portions representing the advertisement previously selected for inclusion within the content stream, encoded according to parameters matching those of other content portions within the content stream.

At (9), the content service 120 retrieves the additional content from the advertisement system 130A. Illustratively, the additional content may be provided by the advertisement system 130A in a format that enables the content service 120 to re-encode or transcode the additional content according to a variety of different parameters, to match the encoding parameters of a given content stream. For example, the additional content may be provided in a "raw" or uncompressed format, or in an compressed format that is high enough quality to allow for re-encoding with parameters selected to match other content portions within a content stream (e.g., as a "mezzanine" file). In one embodiment, a location of the additional content may be identified by the advertisement system 130A (e.g., within the VAST response), to enable the content server 120 to retrieve the additional content.

Thereafter, at (10), the content service 120 generates content portions representing the selected advertisement, encoded according to parameters matching other content portions included within the content stream. For example, where the content stream includes a set of content portions encoded according to a given set of parameters (e.g., a specific bitrate, frame rate, or resolution, a pre-defined profile associated with specific encoding parameters, etc.), the content service 120 can process the additional content, as received from the advertisement system 130, in order to generate the content portions called for in the manifest file. Illustratively, the content management engine may interact with a pool of content encoders, such as described in the '347 application incorporated by reference above, to instruct the pool of content encoders to encode the additional content with appropriate parameters. Thereafter, at (11), the content service 120 can store the encoded, matching content portions within the content data store 124 for later retrieval by the POPs 112 or client computing devices 102. Thus, via the interactions of FIG. 3A and 3B, where an advertisement or other additional content is selected for inclusion within a content stream, but is not yet available in an encoding with parameters matching other portions of the content stream, a fallback content portion can be included in the content stream to enable playback of the content stream. Further, the additional content may be re-encoded, in response to the request for the content stream, into a set of content portions with parameters matching the content stream. Thereafter, the re-encoded additional content, as represented by the set of content portions, may be included within manifest files for subsequent requests of the content stream.

While the interactions of FIGS. 3A and 3B are described above sequentially, it is contemplated that some or all of the interactions may repeatedly occur, and that these interactions may occur at least in part concurrently. For example, the manifest generation service 114 may concurrently or simultaneously transmit a manifest to a POP 112 and request that content portions within the manifest be created. As a further example, the streaming content delivery system 110 may be configured to deliver multiple manifests for a given item of streaming content, or to deliver a single manifest as multiple transmissions over time. Thus, prior to each point in which a new manifest or section of a manifest is transmitted to the client computing device 102, the manifest generation service 114 may determine a new set of content portions to be identified within the new manifest or section. In some instances, the new set of portions may vary based on monitored information regarding the streaming content (e.g., as obtained from the monitoring service 118). For example, where monitoring information indicates that a client computing device 102 did not output a portion (or, potentially, that the portion was never requested by the client computing device 102), the manifest generation service 114 may identify the portion (or another additional content portion) in a new manifest or manifest section. Thus, where a user "skips" over a portion (e.g., an advertisement) in an effort not to view the portion, a new advertisement or protected portion may be identified in the manifest. In some instances, new manifests may identify only additional content (e.g., and not other content, such as main content) until a client computing device 102 outputs the content, at which point additional manifests (or manifest sections) can be provided including other content.

Moreover, while the interactions of FIGS. 3A and 3B are described with respect to a single series of content portions, embodiments of the present disclosure may enable the use of alternative series of content portions, each of which form a different version of streaming content. For example, a first series of content portions may present streaming content at a first quality level, a second series at a second quality level, etc. The various series may be identified in a single manifest or multiple manifests provided to the client computing device 102. In some instances, the client computing device 102 may switch between outputting content portions of different series to account for the state of the device 102 (e.g., to account for slow communications between the device 102 and the streaming content delivery system 110). Accordingly, the content service 120 may in some instances act to re-encode an additional content according to a variety of different parameters, to satisfy the content portions identified within the manifest file.

While the interactions described above illustrate the identification of fallback content portions in a manifest file in instances where a selected advertisement is not available in a format matching other portions within a content stream, alternative implementations are possible and contemplated herein. For example, the manifest generation service 114 may in some instances identify matching content portions for inclusion within a manifest, regardless of whether such matching content portions are actually available at the streaming content delivery system 110 at the time of manifest generation. For example, the manifest generation service 114 may include, within the manifest, information identifying, for a given content portion, a content to be included within the portion (e.g., a section of an advertisement), as well as desired encoding parameters for the content, without first verifying that the appropriately encoded content is available at the content service 120. In some instances, the identifying information may include a file identifier or uniform reference identifier including the desired content and encoding parameters (e.g., http://scds.tld/ad1_segment1_hd.ts"). Thereafter, the manifest generation service 114 may transmit a request to the content service 120 to generate any content portions identified within the manifest but not yet available at the streaming content delivery system 110 (e.g., within the content data store 124). In one embodiment, the manifest generation service 114 may transmit the complete manifest to the content service 120, and the content management engine 122 may identify any content portions referenced within the manifest but not yet available from the content data store 124. In another embodiment, the manifest generation service 114 may identify any content portions referenced within the manifest but not yet available from the content data store 124. Illustratively, identification of content portions referenced within the manifest but not yet available from the content data store 124 may include determining whether a specific portion of an underlying content (e.g., a specific advertisement, warning, disclaimer, etc.) referenced in the manifest is available within the content data store 124 in a version that is encoded with parameters matching other content portions referenced within the manifest. In one embodiment, identification of content portions referenced within the manifest but not yet available from the content data store 124 may include comparing file identifiers (e.g., URIs) referenced within the manifest file and corresponding identifiers included within the content data store 124. Thereafter, the content service 120 may begin to encode the content portions identified in the manifest file, such that if encoding completes prior to a request for the content portions, the newly encoded content portions can be transmitted to a client computing device 102. In the instance that encoding does not complete prior to a request for a content portion, a fallback content portion can be transmitted to the requesting client computing device 102.

Illustrative interactions for enabling a client device 102 to view streaming content based on a manifest file including content portions that may not yet be available at the content service 102 will be described with reference to FIG. 4A. Specifically, FIG. 4A depicts a set of illustrative interactions for providing a fallback content portion in response to a determination that a requested content portion is not available at the content service 120, while FIG. 4B depicts a set of illustrative interactions for providing a requested content portion, such as in instances where a request-driven encoding of the requested content portion has completed.

Figure 4A:
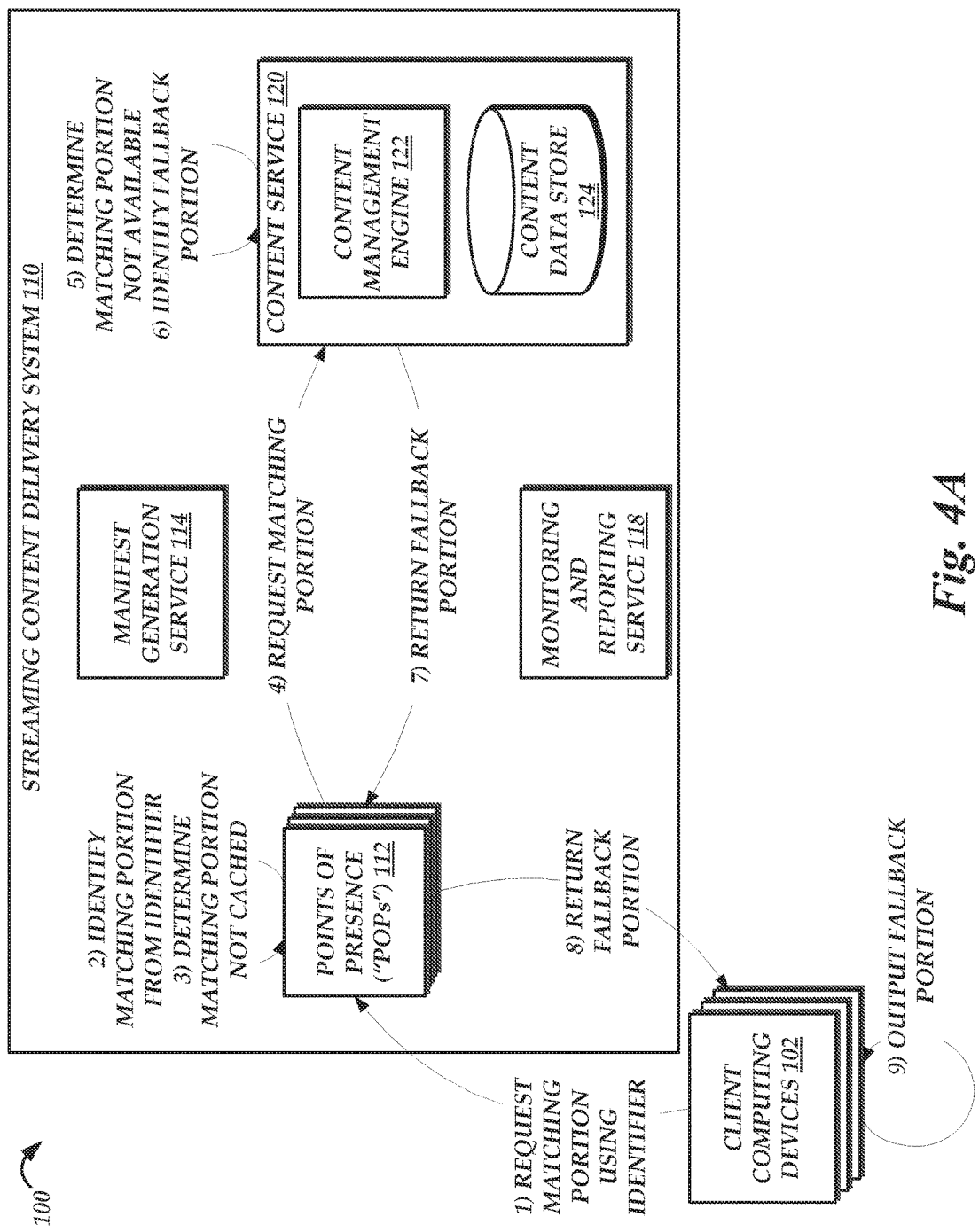
FIGS. 4A and 4B are block diagrams depicting illustrative interactions of the streaming content delivery system of FIG. 1 for responding to a client request for a content portion identified within a manifest file by providing either a content portion encoded to match other content portions identified within the manifest file or a fallback content portion.
Figure 4B:
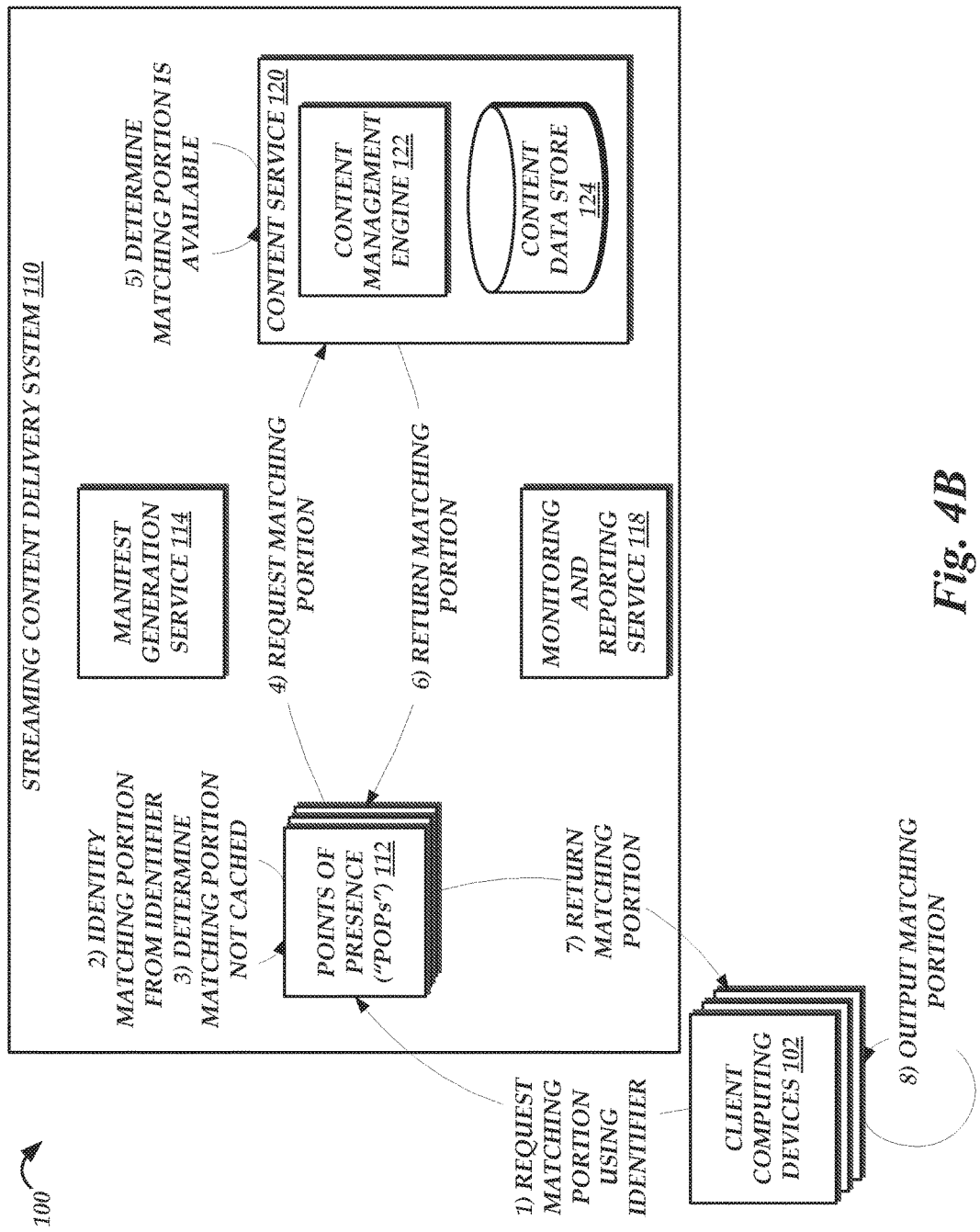

The interactions of FIG. 4A begin at (1), where a client computing device 102 requests a content portion from a POP 112 of the streaming content delivery system 110, using an identifier for the portion included within a manifest. For the purposes of description of FIG. 4A, it will be assumed that the requested content portion corresponds to an additional content (e.g., a disclaimer or advertisement), which has been encoded to match encoding parameters of other content portions (e.g., main content) within a manifest. As noted above, manifest files may be generated by referencing content portions regardless of whether the content portion is actually available at the streaming content delivery service 110. Accordingly, the interactions of FIGS. 4A and 4B do not assume that the requested matching content portion actually exists at the streaming content delivery service 110.

In one embodiment, the request identifies the requested content portion by use of a file name of a content portion expected to be available at the streaming content delivery system 110 (e.g., as generated according to request-driven encoding). In another embodiment, the request identifies the requested content portion by use of a concealed identifier generated in accordance with embodiments of the '423 application, incorporated by reference above, which corresponds to an actual identifier of a content portion expected to be available at the streaming content delivery system 110. The request may be automatically generated by the client computing device 102 (e.g., by a web browser or other application) based on processing the manifest previously obtained from the streaming content delivery system 110. On receiving the request, the POP 112, at (2) determines the requested portion based on the identifier. Illustratively, where concealed identifiers are not used, the POP 112 may directly identify a requested content portion from the identifier provided by a client computing device 102 (e.g., an actual identifier of the requested portion). Where concealed identifiers are used that are generated by encrypting an actual identifier with an encryption key, the POP 112 may utilize that key to decrypt the concealed identifier, and thus determine an actual identifier of the requested portion. Where concealed identifiers are used that are generated using other conversions (e.g., random assignment), the POP 112 may utilize information provided by the manifest generation system 114, such as a mapping of concealed identifiers to actual identifiers, to determine which actual identifier corresponds to the requested portion.

As noted above, a POP 112 may function to cache at least some content portions requested by client computing devices 102, such that second or subsequent requests for a content portion by the same or a different client computing device 102 can be serviced by providing a copy of the content portion included within the cache. Thus, if the POP 112 has recently received a request for the matching content portion, the POP 112 may return the matching content portion directly to the client computing device 102. However, if no client computing device 102 has recently requested the matching content portion (as may be the case if the matching content portion has been generated on-the-fly to match parameters of other portions identified within a manifest file), the POP 112 can determine, at (3), that the matching content portion is not cached. As such, the POP 112, at (4), requests the matching content portion from the content service 120.

At (5), the content service 120 (e.g., via the content management engine 122) determines whether the requested, matching content portion is available within the content data store 124. Illustratively, assume that the requested, matching content portion is the same matching content portion that is discussed above with respect to interaction (10) of FIG. 3B. Further, assume that the content service 120 obtains the request for the matching content portion before generation of that matching content portion has completed, which may occur, for example, due to computational time required to generate the matching content portion. Under such circumstances, one option may be for the content service 120 to return and error to the POP 112, such as a "file not found" error, which in turn may transmit the error to the client computing device 102. As would be appreciated by one skilled in the art, such an option would likely be undesirable. Accordingly, rather than returning an error in instances where a requested matching content portion is unavailable, the content service 120 may instead identify a fallback content portion, at (6). As discussed above with respect to FIGS. 3A and 3B, a fallback content portion may in some instances include the same underlying content as the requested content portion, but encoded according to different parameters. For example, the fallback content portion may include the same audio, video, or textual content encoded at a lower resolution, bitrate, or frame rate. In other instances, a fallback content portion may represent a different underlying content from the requested content portion, such as a different advertisement, formatted according to the same parameters as a matching content portion. While use of a fallback portion may be undesirable when compared to use of the matching content portion, use of fallback portions can enable implementation of request-driven encoding in many instances while still providing acceptable delivery of a content stream in instances where request-driven encoding cannot be completed in a timely manner. Moreover, use of a fallback portion may be relatively rare for commonly accessed content streams, as subsequent requests for a matching content portion are likely to occur after such a matching content portion has been generated by the content service 120. In some instances, content providers (e.g., providers of main content or additional content) may specify criteria by which the content service 120 may select fallback content. For example, and advertisement system 130 may include within a VAST response criteria for selecting a fallback content when a primary selected content is not available. Such criteria may include, by way of non-limiting example, encoding parameters of the fallback content, subject matter of the fallback content, tags associated with the fallback content, or providers of the fallback content.

Where a fallback content portion represents the same underlying content as a requested content portion, but encoded according to different parameters, such fallback content portions may be formatted such that storage of fallback content portions for every potential content portion is possible, either at the streaming content delivery system 110 or at an external service. For example, fallback content portions may be encoded at a relatively low bitrate or resolution, such that storage of each fallback content portion requires relatively little storage space in the content data store 124. As a further example, fallback content portions may be hosted outside the streaming content delivery system 110, such as at a system of a provider of the content underlying the fallback content portion (e.g., the additional content), thus requiring no storage space of the content data store 124.

Accordingly, at (7), the content service 120 may return the fallback content portion to the POP 112. Where the fallback content portion 112 is stored within the content data store, the content service 120 may return the fallback content portion directly. Where the fallback content portion 112 is stored within an external data store, such as a data store of a provider of the content underlying the fallback content portion (e.g., a data store of the advertising system 130), the content service 120 may return to the POP 112 a reference to a location of the fallback content portion, such that the POP 112 may then retrieve the fallback content portion from the location.

In some embodiments, the response provided by the content service 120 may be formed to inhibit improper caching of the fallback content portion at the POP 112. Recall, for example, that the fallback content portion is returned to the POP 112 in response to a request for a matching content portion. As such, the configuration of the POP 112 may cause the POP 112 to cache the fallback content portion as the matching content portion. This may lead the POP 112 to service subsequent requests for the matching content portion with the fallback content portion, regardless of whether the actual matching content portion is then available at the content service 120. To address this issue, the content service 120 may in one embodiment establish a small or zero time-to-live, or "TTL," value for the fallback content portion, indicating to the POP 112 that the fallback content portion should be considered immediately or substantially immediately (e.g., within milliseconds or seconds) invalid. Thus, assuming that the POP 112 appropriately recognizes the TTL value, the fallback content portion can be expected to not be cached at the POP 112, and further requests for the matching content portion may result in a repetition of the interactions of FIGS. 4A or 4B.

In some embodiments, the issue of potential caching at the POPs 112 may further be addressed by the content service 120 by utilization of redirections. For example, rather than returning a fallback content portion directly in response to a request for a matching content portion, the content service 120 may return a redirection to a URI of the fallback content portion. The use of redirection may be advantageous, for example, to allow for caching of the fallback content portion at the POP 112. For example, where a POP 112 retrieves a redirection to a URI associated with a fallback content portion, the POP 112 may fulfill the request by a locally cached version of the fallback content portion associated with the URI. Illustratively, the redirection may be associated with a low or zero TTL value, such that the POP 112 is unlikely to consider the redirection valid for subsequent requests to access the matching content portion.

At (9), the POP 112 may return the retrieved fallback content portion to the client computing device 102, in order to fulfill the request for the matching content portion. The client computing device 102 can then, at (10), output the fallback content portion as part of the content stream, thus viewing the content encoded within the fallback content portion.

With reference to FIG. 4B, a set of interactions is depicted that may occur alternatively to those of FIG. 4A. Specifically, while the interactions of FIG. 4A occur where a requested, matching content portion is not available at the content service 120 (e.g., because the matching content portion is still being generated by the content service 120), the interactions of FIG. 4B depict an instance in which the requested matching content portion is available at the content service 120. For example, the interactions of FIG. 4B may occur where a requested matching content portion occurs near the end of a series of content portions identified within a manifest file, such that an amount of time that occurs between transmission of the manifest file to the client computing device and requesting of the matching content portion by the client computing device is sufficient to enable the content service 120 to generate the matching content portion. As such, interactions (1) through (4) of FIG. 4B are substantially similar to the corresponding interactions of FIG. 4A, and will be not re-described. However, unlike the interactions of FIG. 4B, at (5), the content service 120 determines that the requested, matching content portion is available at the content service 120 (e.g., after having been generated in response to generation of the manifest file referencing the matching content portion). Thus, at (6), the matching content portion is returned to the POP 112. Illustratively, the matching content portion may be formatted or associated with metadata encouraging the POP 112 to cache the matching content portion, such that subsequent requests for the matching content portion (e.g., by the same or a different client computing device 102) may be serviced by the POP 112 from a cached copy. For example, the content service 120 may, in returning the matching content portion, associate the matching content portion with a relatively long (e.g., on the order of minutes or hours) TTL value.

Thereafter, the matching content portion can be returned from the POP 112 to the client computing device 102, at (7). The client computing device 102 can then output the matching content portion at (8). Thus, the client computing device 102 is enabled to output a content stream formed by a set of content portions encoded according to matching parameters, without requiring the streaming content delivery service 102 to maintain a pre-generated set of matching content portions. Rather, at least some content portions (e.g., corresponding to additional content included in a content stream to accompany main content) may be dynamically encoded in response to a request for the content stream. In instances where such dynamic encoding is completed prior to a request for the corresponding content portions, those content portions may be returned to a client computing device. Moreover, those content portions may be cached, either at POPs 112 or at a content server 120, such that subsequent requests for content streams including the content portions may be fulfilled based on previously generated content portions. However, where dynamically encoded content portions are not available at a time requested by a client computing device 102, the client computing device 102 may nevertheless output the content stream utilizing fallback content portions.

While the interactions of FIGS. 4A and 4B are described with reference to a request from a client computing device 102 for a specific content portion corresponding to an identifier included within a manifest file, some embodiments of the present disclosure may utilize identifiers not directly corresponding to any given content portion. For example, where additional content is to be included in a content stream, the manifest generation service 114 may be configured to include a "placeholder" identifier for such additional content within a manifest file, without necessarily determining which additional content is to be included. Illustratively, the placeholder identifier may reference a URI of the content service 120 not associated with an individual content portion (e.g., "http://contentservice.tld/placeholder.ts"). On receiving a request for a portion corresponding to a placeholder identifier, the content server 120 may dynamically determine the content portion to return in response to the request. Illustratively, the content portion may be determined based on what content portions are available at the content server 120 with parameters matching other portions of a stream being output by a requesting device. In some instances, the content portion may be determined based on interactions with an advertisement system 130, such as via the VAST specification.

Figure 5:
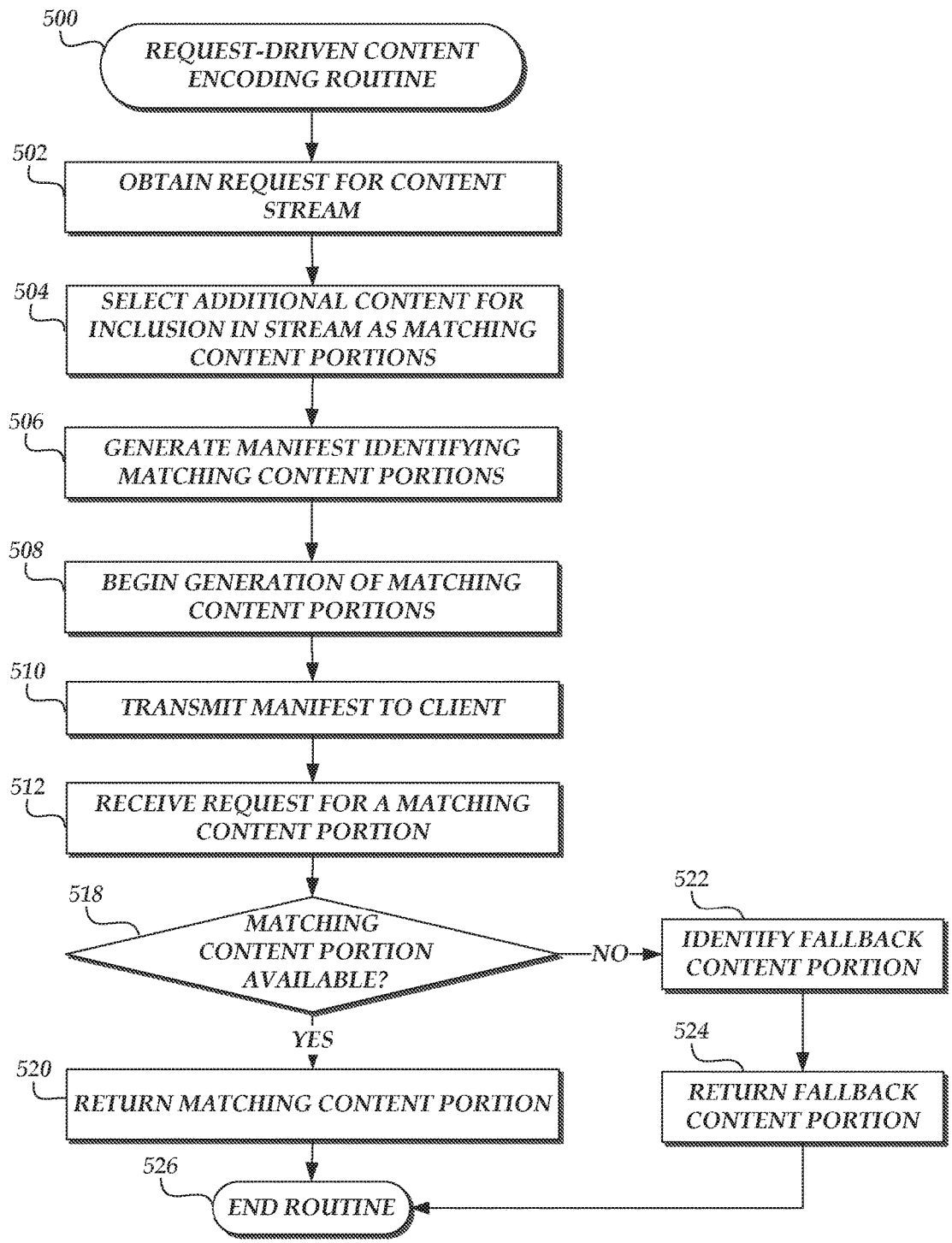
FIG. 5 is a flow chart depicting an illustrative routine for providing matching content portions within a content stream based on client requests for the content stream.

With reference to FIG. 5, one illustrative routine 500 for providing streaming content including portions created via request-driven encoding will be described. The routine 500 may be carried out, for example, by the content delivery system 110 of FIG. 1 (e.g., utilizing the content service 120). The routine 500 begins at block 502, where the content delivery system 110 obtains a request for streaming content from a client computing device 102. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110.

At block 504, the streaming content delivery system 110 selects additional content to be included in a content stream as a set of matching content portions, with encoding parameters matching those of other content portions within the stream (e.g., those portions representing a main content). In some instances, the streaming content delivery system 110 may determine additional content by interaction with third party external systems, such as advertisement systems 130. Further, the streaming content delivery system 110 may determine the additional content based on information regarding the client computing device 102, such as by delivering information regarding the client computing device 102 to the advertisement system 130 for use in an advertisement selection algorithm.

At block 505, the streaming content delivery system 110 generates a manifest file for the content stream, referencing a series of content portions that collectively represent the content stream. This series of content portions may include a first set of content portions corresponding to a main content, and a second set of content portions corresponding to additional content. The first set of content portions may be stored at the streaming content delivery service 110 and represent a main content encoded according to a first set of parameters (e.g., bitrate, frame rate, resolution, etc.). The second set of content portions may represent additional content encoded according to a matching set of parameters (e.g., the same or a similar bitrate, frame rate, resolution, etc.), such that output of the second set of content portions is unlikely to result in technical difficulties on a client computing device or a disruptive consumption experience for a client. For the purposes of FIG. 5, this second set of content portions will be referred to as "matching content portions." However, despite being referenced within the manifest file, these matching content portions may not yet exist on the streaming content delivery service 110, as pre-generation of every possible matching content portion may be computationally prohibitive.

Thus, at block 508, the streaming content delivery service 110 can begin generation of the matching content portions. Illustratively, the streaming content delivery service 110 may obtain a copy of the additional content corresponding to the matching content portions, which is suitable for re-encoding with parameters matching other portions of the content stream. This copy may include an uncompressed or high resolution copy, such as a "raw" file, a "master" copy, or a "mezzanine" file, and may be stored at the streaming content delivery service 110 or retrieved from another system, such as a system of a provider of the additional content. Thereafter, the streaming content delivery service 110 may re-encode the copy into a set of portions formatted for inclusion in the content stream. These portions may be determined, for example, based on information included within the manifest file, such as the number and duration of the portions and the encoding parameters to be used to encode the portions. In some instances, the streaming content delivery service 110 may work with other services, such as the content streaming system of the '347 application incorporated by reference above, to encode the matching content portions.

Additionally, at block 510 (which may occur prior to or simultaneously with implementation of block 508, and thus prior to generation of the matching contents being completed), the manifest file is transmitted to a client computing device associated with the request for the content stream.

At block 512, a request is received for a matching content portion, as referenced within the manifest file. Illustratively, the request may be received from a POP, based on a request transmitted to the POP by a client computing device. The request from the client computing device, in turn, may be based on processing the manifest file via a playback application, such as a web browser, video player, audio player, etc. In other embodiments, the request may be received directly from a client computing device.

At block 514, the streaming content delivery service 110 determines whether the requested matching content portion is available at the streaming content delivery service 110. Where generation of the matching content portion (e.g., as begun at block 508) has completed, block 518 may evaluate as true, and the routine 500 can proceed to block 520, where the streaming content delivery service 110 returns the requested matching content portion to the requesting device (e.g., a POP or a client computing device). In some instances, the streaming content delivery service 110 may modify the requested matching content portion, or associate the requested matching content portion with metadata, to facilitate caching of the matching content portion. For example, the streaming content delivery service 110 may establish a relatively long (e.g., on the order of minutes or hours) TTL value for the matching content portion, such that a POP is likely to cache the matching content portion, and such that subsequent requests for the matching content portion may be fulfilled by the POP based on cached data. Thereafter, the routine 500 may end at block 526.

In the instance that the requested matching content portion is not available at the streaming content delivery service 110, such as where generation of the matching content portion has not yet completed, block 518 may evaluate as false. The routine 500 thus proceeds to block 522, where a fallback content portion is identified. The fallback content portion can represent the same underlying content as a requested content portion (e.g., the same underlying audio, video, or text), encoded according to different parameters. For example, the fallback content portion can represent a low quality or low resolution copy of the matching content portion that was requested. In one embodiment, the streaming content delivery service 110 may maintain a set of fallback content portions for each additional content that might be included in a content stream. Because these fallback content portions can be utilized in many different content streams (e.g., regardless of the encoding parameters of the content stream), and in some instances may be relatively low quality, storage of pre-generated fallback content portions at the streaming content delivery service 110 may not be computationally prohibitive. In other embodiments, fallback content portions may be stored at an external system, such as a system of a provider of the underlying content. Thus, the streaming content delivery service 110 may identify the fallback content portions on such an external system.

At block 524, the streaming content delivery service 110 returns to a requesting device (e.g., a POP or client computing device) the fallback content portion. In some instances, the streaming content delivery service 110 may return the fallback content portion directly. In other instances, the streaming content delivery service 110 may return a reference to the fallback content portion (e.g., a HTTP 3xx redirect), to enable the requesting device to retrieve the fallback content portion. In either instance, the returned information may be modified by the streaming content delivery service 110 to inhibit caching or future reliance on the information. For example, the streaming content delivery service 110 may associate the returned information (e.g., the fallback content portion or a reference to the fallback content portion) with a zero or low TTL value, such that subsequent requests for the matching content portion would be expected to again be transmitted to the streaming content delivery service 110 (rather than being fulfilled based on a cached version of the information returned at block 524). Thereafter, the routine 500 may end at block 526.

While the routine 600 is described sequentially, implementation of various blocks of the routine 600 may occur at least in part concurrently, and may be achieved by different components within the streaming content delivery system 110. For example, the streaming content delivery system 110 may utilize a manifest generation service to implement some portion of the routine 600 (e.g., blocks 502, 504, 506, and 510) and a content service to implement other blocks of the routine 600 (e.g., blocks 508, and 512-524). Functionalities of the routine 600 may further be implemented, in part or in whole, on POPs (e.g., within a content delivery network). Moreover, while the routine 600 is illustratively described with respect to a single series of content portions forming a given content stream, some embodiments may provide multiple series of content portions, each of which forms a version of the content stream, and which may be combined as required during output on a client computing device. For example, each series of content portions may form a different version of the content stream of a different quality level (e.g., varying bitrate or resolution), and the client computing device may select between different series according to computational resources of the client computing device (e.g., network bandwidth, processing power, memory, etc.). In such instances, each series may be identified in a manifest file, and include content portions that may not yet be available at the streaming content delivery service 110. For example, a manifest file may reference standard definition, high definition, and ultra-high definition versions of a content portion, regardless of whether these version are available at the streaming content delivery service 110. The streaming content delivery service 110, in turn, may begin to create such versions on generation of the manifest file, such that they can be provided to a client computing device after generation. In the instance that a requested version is not yet available, the streaming content delivery service 110 may provide a default, fallback version that is pre-generated at the streaming content delivery service 110.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing streaming content, the system comprising:
   a data store including a first set of content portions corresponding to a main content, wherein the first set of content portions are encoded according to one or more first parameters; and
   one or more computing devices configured with computer-executable instructions that, when executed, cause the computing devices to:
      obtain a request from a client computing device to provide a content stream including the main content;
      determine that an additional content is to be included in the content stream;
      determine that the data store does not include a second set of content portions representing the additional content encoded according to the one or more first parameters;
      select a fallback content for inclusion within the content stream, wherein the data store further includes a third set of content portions representing the fallback content encoded according to the one or more first parameters;
      generate a manifest for the content stream, wherein the manifest includes identifiers for respective content portions within the first set of content portions and identifiers for respective content portions within the third set of content portions;
      transmit the manifest to the client computing device; and
      begin encoding the additional content according to the one or more first parameters to result in second set of content portions representing the additional content encoded according to the first set of parameters.

2. The system of claim 1, wherein the main content is at least one of audio, video, or textual content.

3. The system of claim 1, wherein the additional content is at least one of a disclaimer, a warning, credits, a dedication, or an advertisement.

4. The system of claim 1, wherein the one or more computing devices are further configured with the computer-executable instructions to:
   obtain a second request to provide second a content stream including the main content; and
   in response to the second request:
      determine that the additional content is to be included in the second content stream;
      determine that the data store includes the second set of content portions representing the additional content encoded according to the one or more first parameters;
      generate a second manifest for the second content stream, wherein the second manifest includes identifiers for respective content portions within the first set of content portions and identifiers for respective content portions within the second set of content portions; and
      transmit the second manifest to the client computing device.

5. The system of claim 1, wherein the one or more computing devices are further configured with the computer-executable instructions to:
   receive a request for a content portion of the third set of content portions; and
   transmit the content portion in response to the request; and wherein the content portion is transmitted to at least one of a client computing device or a point of presence (POP) within a content distribution network.

6. The system of claim 1, wherein the one or more computing devices are further configured with the computer-executable instructions to;
transmit a request to a system associated with the provider of the additional content to select the additional content for representation in the content stream; and
obtain a response identifying the additional content representation in the content stream.

7. A computer-implemented method implemented by a streaming content delivery system, the computer-implemented method comprising:
obtaining a request from a client computing device to provide a content stream;
determining one or more encoding parameters for the content stream;
selecting a content to be included in the content stream;
determining that the content is not available in a format encoded according to the one or more encoding parameters;
beginning an encoding of the content according to the one or more encoding parameters;
selecting a fallback content for inclusion within the content stream;
generating a manifest for the content stream, wherein the manifest includes an identifier corresponding to the fallback content; and
transmitting the manifest to the client computing device.

8. The computer-implemented method of claim 7 wherein selecting the content to be included in the content stream comprises:
transmitting a request to a system associated with the provider of the content to select the content for representation in the content stream; and
obtaining a response identifying the content for representation in the content stream.

9. The computer-implemented method of claim 8, wherein the response is formatted according to the video ad serving template (VAST) specification.

10. The computer-implemented method of claim 7, wherein the one or more encoding parameters include a value for at least one of a bitrate, audio normalization values, frame rate, or resolution of content portions to be output as part of the content stream.

11. The computer-implemented method of claim 7, wherein the manifest further includes an identifier corresponding to a main content to be output as part of the content stream.

12. The computer-implemented method of claim 7 further comprising:
receiving a second request for the content stream;
determining that the content is available in the format encoded according to the one or more encoding parameters;
generating a second manifest for the content stream, wherein the second manifest includes an identifier corresponding to the content as encoded according to the one or more encoding parameters; and
transmitting the manifest to the client computing device.

13. The computer-implemented method of claim 7, wherein the fallback content corresponds to at least one of an alternative to the content or a representation of the content encoded according to one or more alternative encoding parameters.

14. Non-transitory computer-readable media including computer-executable instructions that, when implemented by a streaming content delivery system, cause the streaming content delivery system to:
obtain a request from a client computing device to provide a content stream;
generate a manifest file for the content stream, wherein the manifest file includes identifiers for content portions to be output as part of the content stream, and wherein at least one content portion to be output as part of the content stream is not yet available at the streaming content delivery system;
transmit the manifest file to the client computing device;
begin encoding a content file to result in the at least one content portion identified within the manifest file;
receive a request for the at least one content portion;
determine that the at least one content portion identified within the manifest file is not available for transmission to the client computing device;
select a fallback content portion; and
transmit the fallback content portion or information identifying the fallback content portion.

15. The non-transitory computer-readable media of claim 14, wherein the content stream is formatted according to at least one of hypertext transport protocol (HTTP) live streaming protocol (HLS), dynamic adaptive streaming over HTTP (DASH), MICROSOFT smooth streaming (MSS) protocol, or HTTP dynamic stream (HDS) protocol.

16. The non-transitory computer-readable media of claim 14, wherein the computer-executable instructions further cause the streaming content delivery system to select one or more parameters for the at least one content portion, and wherein the computer-executable instructions cause the streaming content delivery system to begin encoding the content file according to the one or more parameters.

17. The non-transitory computer-readable media of claim 14, wherein the one or more parameters for the at least one content portion are selected based at least in part on one or more parameters of other content portions to be output as part of the content stream.

18. The non-transitory computer-readable media of claim 14, wherein the computer-executable instructions further cause the streaming content delivery system to select a fallback content portion corresponding to a default representation of contents within the content file.

19. The non-transitory computer-readable media of claim 14, wherein the information identifying the fallback content portion is a redirection to a location of the fallback content portion.

20. The non-transitory computer-readable media of claim 19, wherein the redirection is associated with a TTL value selected to discourage caching of the redirection.

* * * * *